(12) United States Patent
Aoyama

(10) Patent No.: US 9,828,151 B2
(45) Date of Patent: Nov. 28, 2017

(54) SECURING MECHANISM

(71) Applicant: Kitagawa Industries Co., Ltd., Inazawa-shi, Aichi (JP)

(72) Inventor: Hiroshi Aoyama, Inazawa (JP)

(73) Assignee: Kitagawa Industries Co., Ltd., Inazawa-shi, Aichi (JP)

( * ) Notice: Subject to any disclaimer, the term of this patent is extended or adjusted under 35 U.S.C. 154(b) by 42 days.

(21) Appl. No.: 14/770,732

(22) PCT Filed: Feb. 28, 2014

(86) PCT No.: PCT/JP2014/055121
§ 371 (c)(1),
(2) Date: Aug. 26, 2015

(87) PCT Pub. No.: WO2014/133151
PCT Pub. Date: Sep. 4, 2014

(65) Prior Publication Data
US 2016/0001944 A1    Jan. 7, 2016

(30) Foreign Application Priority Data

Feb. 28, 2013  (JP) ................................ 2013-039146

(51) Int. Cl.
*F16B 19/00* (2006.01)
*B65D 63/10* (2006.01)
(Continued)

(52) U.S. Cl.
CPC ........ *B65D 63/1027* (2013.01); *F16B 21/086* (2013.01); *F16B 21/088* (2013.01); *B65D 2563/108* (2013.01); *F16B 2/08* (2013.01)

(58) Field of Classification Search
CPC ... B65D 63/1027; F16B 21/088; F16B 21/086
(Continued)

(56) References Cited

U.S. PATENT DOCUMENTS 2,969,216 A * 1/1961 Hallsey ................ F16L 3/2332
                                                        24/16 PB
3,810,279 A   5/1974  Swick et al.
(Continued)

FOREIGN PATENT DOCUMENTS

JP    S49117866 A    11/1974
JP    S6235106 U     3/1987
(Continued)

OTHER PUBLICATIONS

Notification of Transmittal of Translation of the International Preliminary Report on Patentability for Application No. PCT/JP2014/055121 dated Oct. 29, 2015.
(Continued)

*Primary Examiner* — Gary Estremsky
(74) *Attorney, Agent, or Firm* — Jenkins, Wilson, Taylor & Hunt, P.A.

(57) ABSTRACT

A securing mechanism comprises a supporting column, an elastic piece, and a plurality of locking pieces. When the supporting column is inserted into a hole, at least one of the plurality of locking pieces is caught by or brought into pressure-contact with an outlet-side peripheral portion of the hole or an inner circumferential portion of the hole. The plurality of locking pieces form a plurality of arrays extending in a projection direction of the supporting column. The locking pieces included in each array of the plurality of arrays are aligned spaced apart from one another in the projection direction of the supporting column. The plurality of arrays comprise a first array and a second array; positions of the locking pieces in the first array are displaced from positions of the corresponding locking pieces in the second array in the projection direction of the supporting column.

6 Claims, 4 Drawing Sheets

(51) Int. Cl.
*F16B 21/08* (2006.01)
*F16B 2/08* (2006.01)

(58) Field of Classification Search
USPC .......................................................... 411/510
See application file for complete search history.

(56) References Cited

U.S. PATENT DOCUMENTS

| | | | | |
|---|---|---|---|---|
| 4,865,281 | A * | 9/1989 | Wollar | F16L 3/13 24/458 |
| 4,936,530 | A * | 6/1990 | Wollar | F16B 2/12 248/68.1 |
| 5,316,245 | A * | 5/1994 | Ruckwardt | F16B 21/084 248/68.1 |
| 5,324,151 | A * | 6/1994 | Szudarek | B60R 16/0215 248/68.1 |
| 5,368,261 | A * | 11/1994 | Caveney | F16L 3/233 248/69 |
| 5,385,321 | A * | 1/1995 | Kume | F16B 2/08 24/16 PB |
| 5,669,731 | A | 9/1997 | Hironaka et al. | |
| 5,704,573 | A * | 1/1998 | de Beers | F16L 3/237 248/73 |
| 5,782,090 | A * | 7/1998 | Locke | F16L 3/127 24/16 R |
| 5,906,465 | A * | 5/1999 | Sato | F16B 21/084 248/68.1 |
| 5,921,510 | A * | 7/1999 | Benoit | F16L 3/2334 248/68.1 |
| 6,719,513 | B1 * | 4/2004 | Moutousis | F16B 21/084 411/510 |
| 7,753,320 | B2 * | 7/2010 | Geiger | F16B 21/084 248/68.1 |
| 8,028,962 | B2 * | 10/2011 | Geiger | F16L 3/12 174/656 |
| 8,221,042 | B2 * | 7/2012 | Vitali | F16B 21/086 411/510 |
| 8,579,240 | B2 * | 11/2013 | Germ | H02G 3/263 24/16 PB |
| 2005/0242247 | A1 * | 11/2005 | Geiger | F16L 3/2332 248/74.3 |
| 2007/0023586 | A1 * | 2/2007 | Geiger | B60R 16/0215 248/71 |
| 2008/0008560 | A1 * | 1/2008 | Wakabayashi | B60R 16/0215 411/510 |
| 2012/0110793 | A1 | 5/2012 | Watanabe et al. | |
| 2013/0119208 | A1 * | 5/2013 | Geiger | F16L 3/233 248/68.1 |

FOREIGN PATENT DOCUMENTS

| | | |
|---|---|---|
| JP | H08145021 A | 6/1996 |
| JP | H10318227 A | 12/1998 |
| JP | 2010276109 A | 12/2010 |

OTHER PUBLICATIONS

International Preliminary Report on Patentability for Application No. PCT/JP2014/055121 dated Jul. 29, 2015.
Partial English Translation of Form PCT/ISA/237 for Application No. PCT/JP2014/055121 dated Apr. 22, 2014.
International Search Report for Application No. PCT/JP 2014/055121 dated Apr. 22, 2014.
Japanses Office Action for Application No. 2013-039146 dated Nov. 8, 2016.
Chinese Office Action for Application No. 201480011272 dated May 3, 2017.
Japanese Decision of Rejection for Application No. 2013-039146 dated Jun. 13, 2017.

* cited by examiner

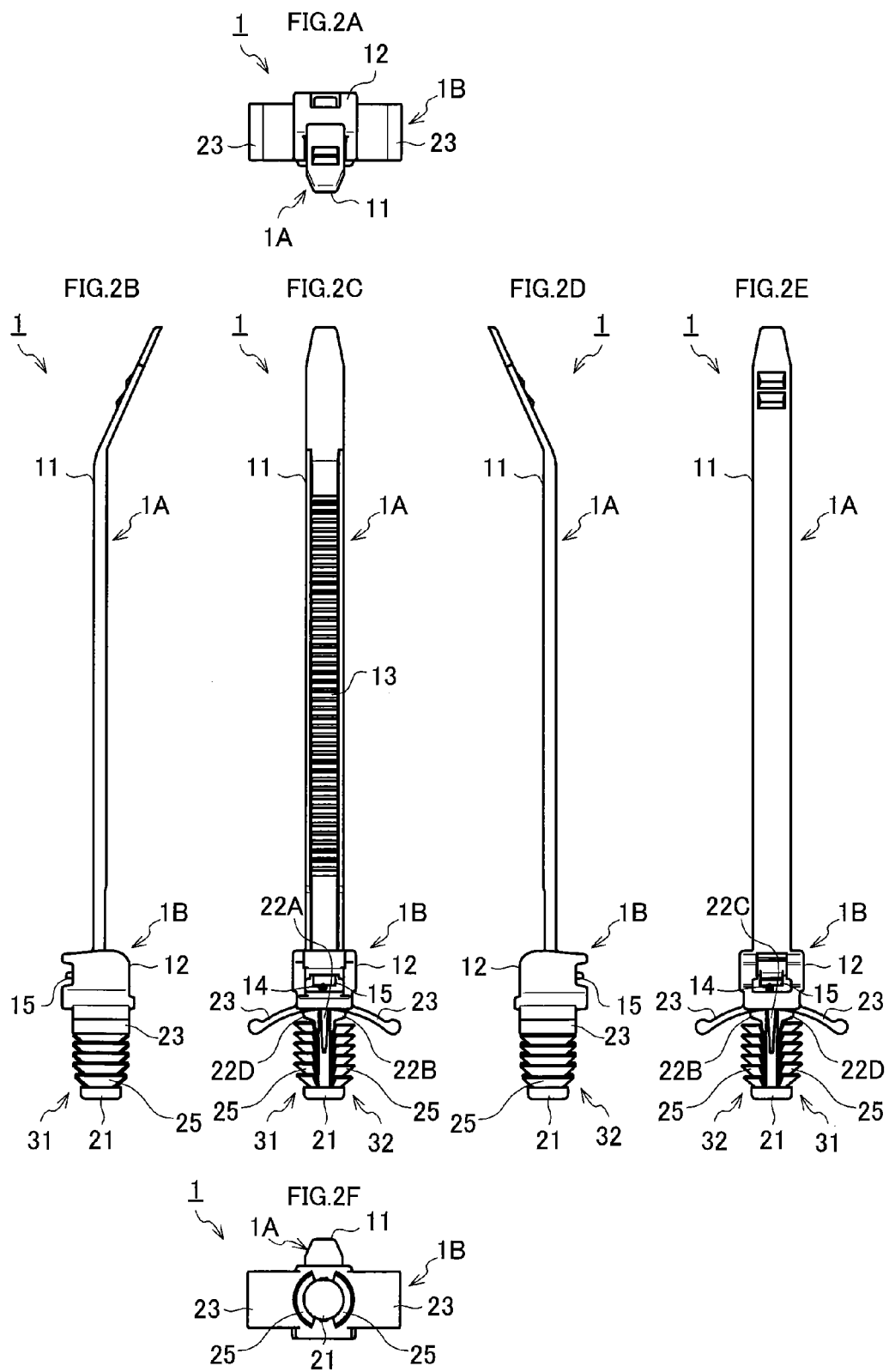

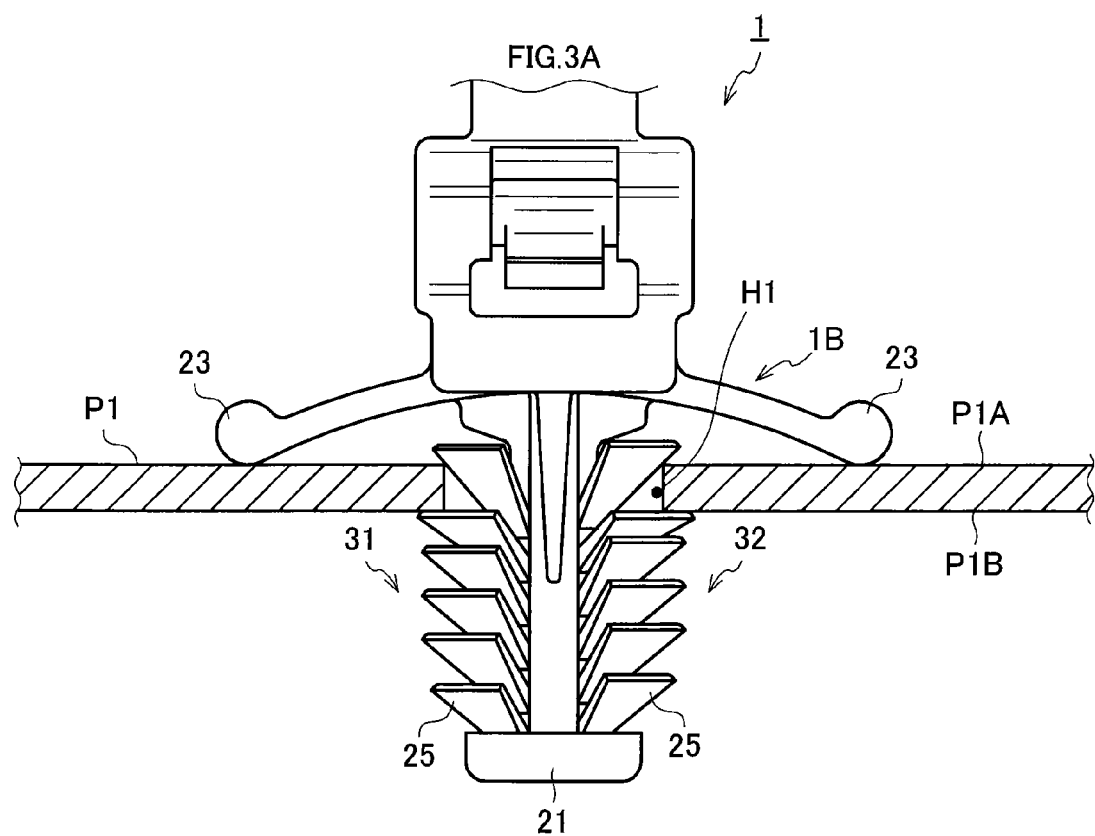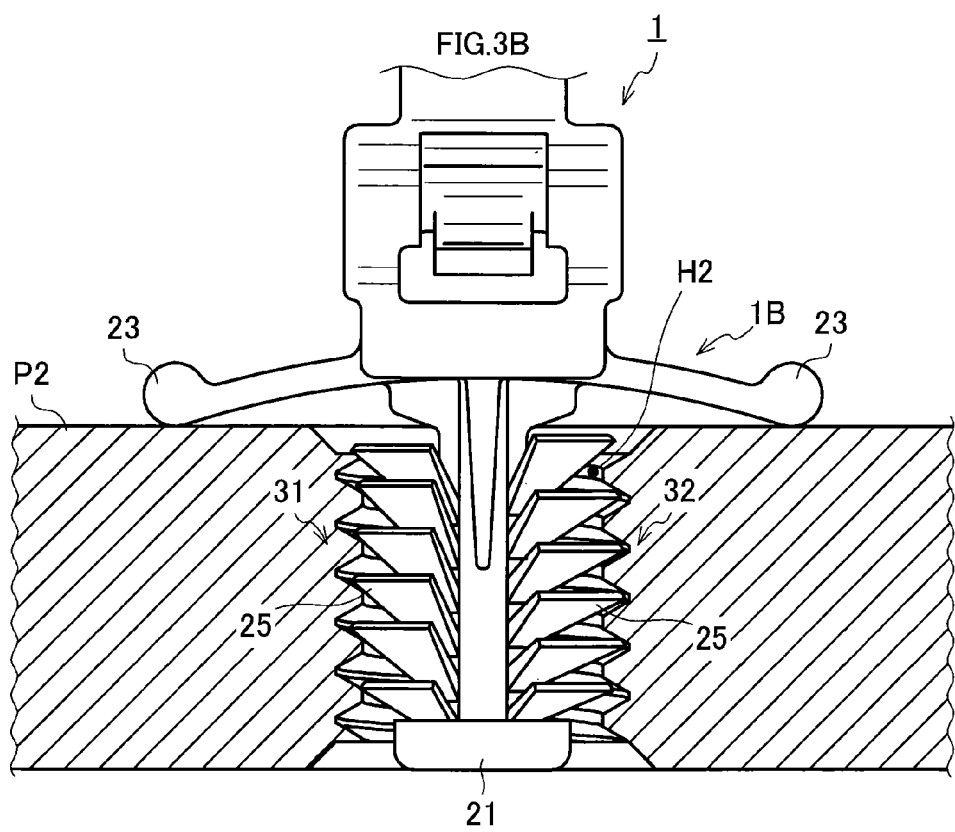

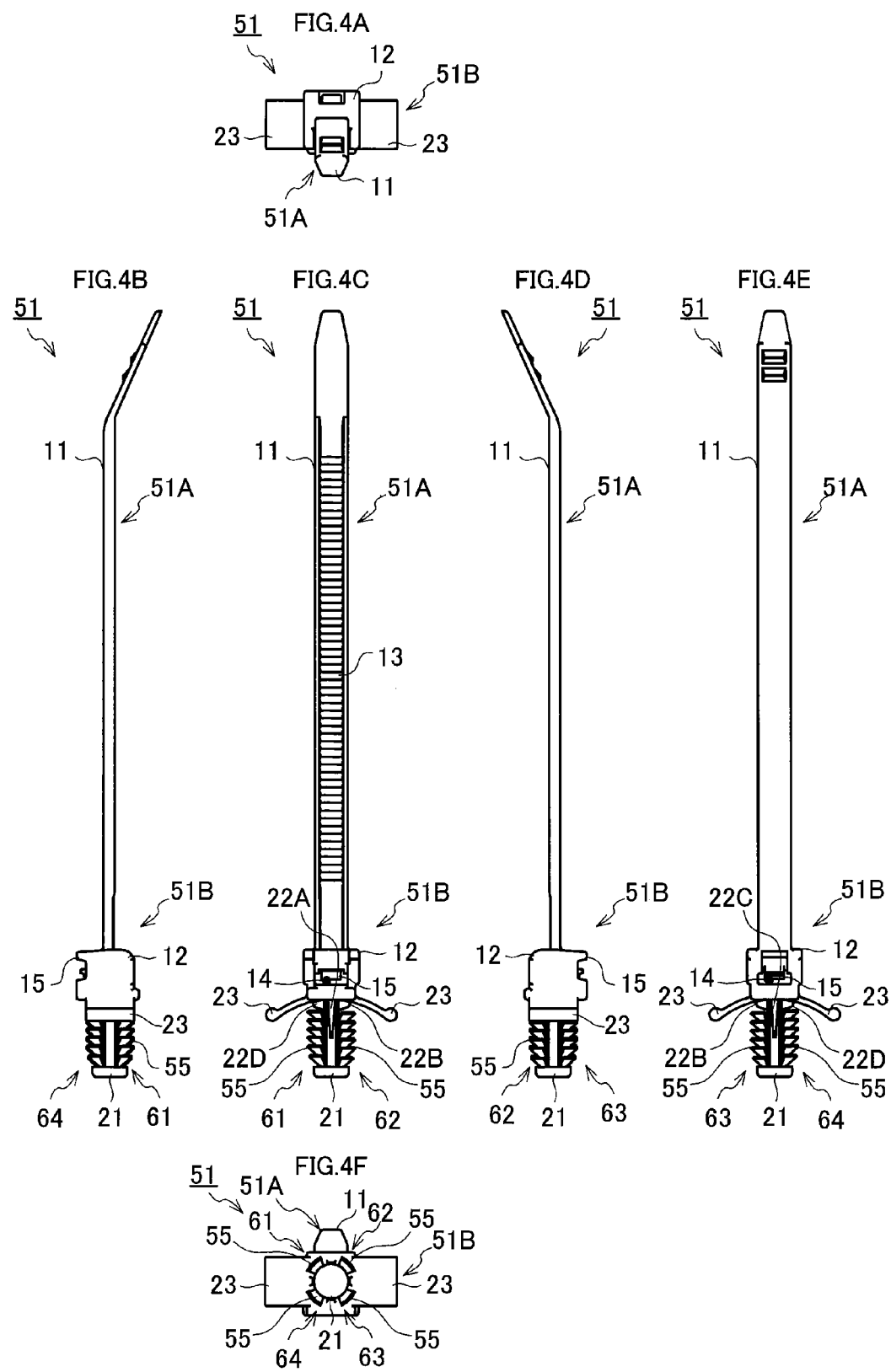

SECURING MECHANISM

CROSS-REFERENCE TO RELATED APPLICATIONS

This international application claims the benefit of Japanese Patent Application No. 2013-39146 filed Feb. 28, 2013 in the Japan Patent Office, the entire disclosure of Japanese Patent Application No. 2013-39146 is incorporated herein by reference.

TECHNICAL FIELD

The present invention relates to a securing mechanism that is formed integrally with a main body and that is to be used to be secured, together with the main body, to a mounting surface.

BACKGROUND ART

A securing mechanism formed integrally with a main body has been used as a means for securing the main body having a specific function (e.g., a function as a cable tie) to a wall surface formed of a plate material, etc. (for example, see Patent Document 1) In the case of a cable tie (Cable tie 11) described in Patent Document 1, a securing mechanism including a plurality of locking pieces (flutes 45) formed in a pleated shape is formed integrally with a main body of the cable tie.

PRIOR ART DOCUMENTS

Patent Documents

Patent Document 1: U.S. Pat. No. 5,921,510

SUMMARY OF THE INVENTION

Problems to be Solved by the Invention

In the securing mechanism described in Patent Document 1, among the plurality of locking pieces, the locking piece most closest to the main body of the cable tie is to be caught by a plate member at a position opposite the main body of the cable tie across the plate member. In this securing mechanism, even though the plurality of locking pieces are provided, only one of the locking pieces actually and effectively functions; the rest of the locking pieces are not used. In addition, in the above-described securing mechanism, only a relatively thin plate member can be used as the plate member that forms a mounting surface.

Meanwhile, if the individual locking pieces are configured to be elastically deformable, an outer diameter of each of the locking pieces can be made smaller. In this case, when the locking pieces are pushed into a through hole having a diameter smaller than the outer diameter of the locking piece, the securing mechanism can be secured to a thicker plate member.

For example, when the plurality of locking pieces that are individually elastically deformable are inserted into the through hole having a smaller diameter than the locking pieces, if the plate member is thicker, some of the locking pieces may not penetrate through the through hole and may stay inside the through hole.

However, in the aforementioned case, if other locking pieces penetrate through the through hole, the locking pieces that have been elastically deformed recover to their original shapes at this point. In this case, one of the other locking pieces is caught by an outlet-side peripheral portion of the through hole. Thus, the securing mechanism configured as above can be used to various plate members ranging from a relatively thin plate member to a thick plate member with use of a single securing mechanism including a plurality of locking pieces.

However, in order to configure the locking pieces to be individually elastically deformable as described above, the locking piece itself needs to have a sufficient thickness. Also, a sufficient gap needs to be provided between the locking pieces, thereby obtaining a movable area for each of the locking pieces so that the individual locking pieces can change their positions. For this reason, in view of obtaining such a movable area, it is difficult to reduce a distance between the locking pieces to a certain distance or less. Thus, a minimum distance of a gap pitch used for aligning the plurality of locking pieces will be obtained accordingly.

Here, for example, if the aforementioned gap pitch is an interval of 1 mm, each time the plurality of locking pieces are pushed into the through hole by 1 mm, another piece of the locking pieces is successively caught by the plate member.

In this case, however, if the plurality of locking pieces are further pushed into the through hole by 0.5 mm, the next one of the locking pieces will not be caught by the plate member. That is to say, in this case, the plurality of locking pieces can be pushed in a stepwise manner only by 1 mm. In other words, a pushing amount of the locking pieces cannot be less than 1 mm.

In one aspect of the present invention, it is desired to configure such that a securing mechanism adopts a configuration in which a plurality of locking pieces provided in a portion to be pushed into a hole formed in a mounting surface function in a stepwise manner in accordance with a pushing amount, and that in this securing mechanism, the pushing amount can be much finely adjusted than conventional adjustments.

Means for Solving the Problems

Hereinafter, configurations adopted in the present invention will be described.

A securing mechanism in one aspect of the present invention is formed integrally with a main body and configured to be able to be secured, together with the main body, to a mounting surface. The securing mechanism comprises a supporting column, an elastic piece, and a plurality of locking pieces. The supporting column projects from a portion formed continuously with the main body in one direction. The supporting column is insertable into a hole formed in the mounting surface from a tip end of the supporting column in a direction of the projection of the supporting column. The elastic piece is provided at a position that abuts the mounting surface on an inlet side of the hole when the supporting column is inserted into the hole. Upon the abutment on the mounting surface, the elastic piece is configured to be elastically deformed so as to exert on the supporting column a force in a direction of extracting the supporting column from the hole. When the supporting column is inserted into the hole, at least one of the plurality of locking pieces is configured to be caught by an outlet-side peripheral portion of the hole or to be brought into pressure-contact with an inner surface area of the hole. The plurality of locking pieces are configured to exert on the supporting column a force in a direction of inhibiting the extraction of the supporting column from the hole. The plurality of locking pieces form a plurality of arrays extending in a direction of the projection of the supporting column. The locking pieces included in each array of the plurality of arrays are aligned spaced apart from one another in the direction of the projection of the supporting column. The plurality of arrays comprise a first array and a second array, and positions of the locking pieces included in the first array are displaced from positions of the corresponding locking pieces included in the second array in the direction of the projection of the supporting column.

In the securing mechanism configured as above, the plurality of the locking pieces form the plurality of arrays extending along the direction of the projection of the supporting column. In each of the arrays, some pieces of the locking pieces are aligned spaced apart from one another in the direction of the projection of the supporting column. Moreover, the plurality of arrays comprise the first array and the second array, and the locking pieces included in the first array are displaced from positions of the corresponding locking pieces included in the second array in the direction of the projection of the supporting column.

For this reason, in a case where a gap pitch used for aligning the locking pieces in each of the first array and the second array is a given distance (for example, 1 mm), the locking piece in the first array is to be caught by a specified portion upon insertion of the supporting column into the hole. Then, without the need for further pushing the plurality of locking pieces into the hole by the given distance (for example, 1 mm), another piece from the locking pieces in the second array is to be caught by the specified portion at a stage prior to the further pushing (e.g., at a stage where the plurality of locking pieces are further pushed into a through hole by 0.5 mm).

As above, in the securing mechanism according to one aspect of the present invention, the pushing amount of the supporting column and the locking pieces can be adjusted by a smaller unit than the gap pitch used in the alignment of the locking pieces. Accordingly, the pushing amount of the locking pieces can be changed by much smaller amounts.

Furthermore, in the securing mechanism according to one aspect of the present invention, the plurality of locking pieces may extend such that each of the locking pieces extends from an outer surface of the supporting column in a direction forming an obtuse angle with respect to a direction of the insertion of the supporting column.

The securing mechanism configured as above can improve a coming-off inhibiting effect by the locking pieces, compared with a case in which the aforementioned portion forming the obtuse angle extends towards a direction forming an acute angle.

Moreover, in the securing mechanism according to one aspect of the present invention, each of the plurality of locking pieces has a shape corresponding to a part of a cylindrical body that expands from one end toward the other end in a shape of a circular truncated cone, and the plurality of locking pieces are disposed at positions at which a center of the cylindrical body coincides with a center of the supporting column.

In the securing mechanism configured as above, each of the locking pieces forms a curved surface. For this reason, each of the locking pieces can have a structure with an excellent bending strength, compared with a locking piece formed in a planner shape.

In addition, in the securing mechanism according to one aspect of the present invention, the plurality of locking pieces are provided such that one array is formed at each of opposing positions across the supporting column, thereby forming two arrays extending in the direction of the projection of the supporting column.

In the securing mechanism configured as above, compared with a case where the plurality of locking pieces are provided in three or more arrays, the individual locking pieces can have a larger size. Thus, strength of the individual locking piece can be easily obtained. In addition, a mold for forming the locking pieces does not have an unnecessary complicated shape. Therefore, formability of a member provided with the locking mechanism can be enhanced, thereby improving productivity.

BRIEF DESCRIPTION OF THE DRAWINGS

FIG. 2A is a plan view of the cable tie; FIG. 2B is a left-side view of the cable tie; FIG. 2C is a front view of the cable tie; FIG. 2D is a right-side view of the cable tie; FIG. 2E is a rear view of the cable tie; and FIG. 2F is a bottom view of the cable tie.

FIG. 3A is an illustrative view showing a state of attachment to a through hole formed in a plate material having a thickness through which a supporting column can penetrate; and FIG. 3B is an illustrative view showing a state of attachment to a threaded hole formed in a plate material having a thickness through which the supporting column cannot penetrate.

FIG. 4A is a plan view of the cable tie; FIG. 4B is a left-side view of the cable tie; FIG. 4C is a front view of the cable tie; FIG. 4D is a right-side view of the cable tie; FIG. 4E is a rear view of the cable tie; and FIG. 4F is a bottom view of the cable tie.

Figure 1A:
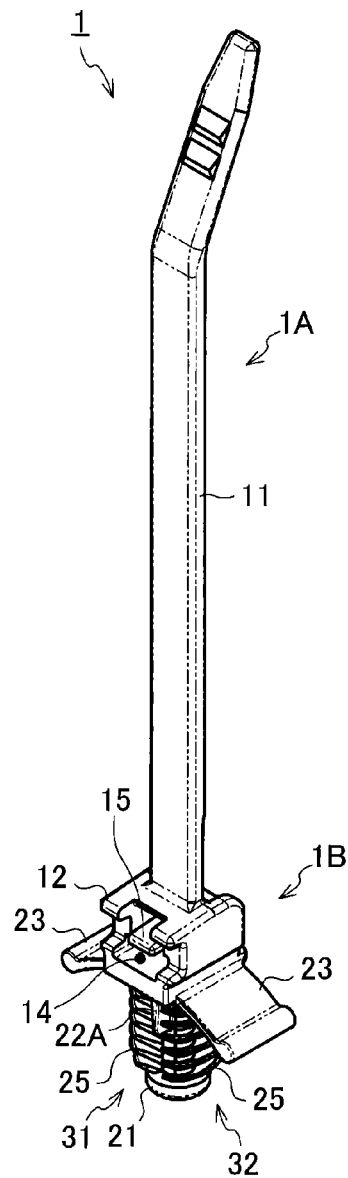
FIG. 1A is a perspective view of a cable tie.

EXPLANATION OF REFERENCE NUMERALS 1,51 . . . cable tie, 1A,51A . . . main body, 1B,51B . . . securing mechanism, 11 . . . belt part, 11A . . . tip end, 12 . . . buckle part, 13 . . . engagement projection, 14 . . . through hole, 15 . . . engagement claw, 21 . . . supporting column, 22A-22D . . . rib, 23 . . . elastic piece, 25,55 . . . locking piece, 31,61 . . . first array, 32,62 . . . second array, 63 . . . third array, 64 . . . fourth array, H1 . . . through hole, H2 . . . threaded hole, P1,P2 . . . plate material, P1A . . . one surface (mounting surface), P1B . . . the other surface

MODE FOR CARRYING OUT THE INVENTION

Next, an illustrative embodiment of the present invention will be described.

[1] First Embodiment

An illustrative embodiment, which will be described below, is an example of providing an illustrative locking mechanism of the present invention in a cable tie. In the following descriptions, explanations are given as needed using respective directions of up and down, left and right, and front and rear as indicated in the figures. These directions are, however, merely specified for a simple explanation of relative positional relationships of each part forming the cable tie. In actual use of the cable tie, the cable tie may be oriented to any given direction.

Figure 1B:
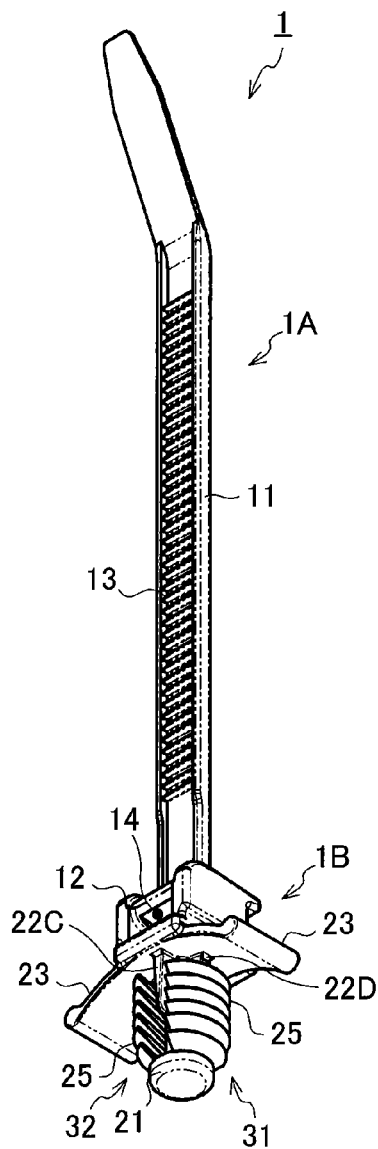
FIG. 1B is a perspective view of the cable tie when viewed from another direction.
Figure 1C:
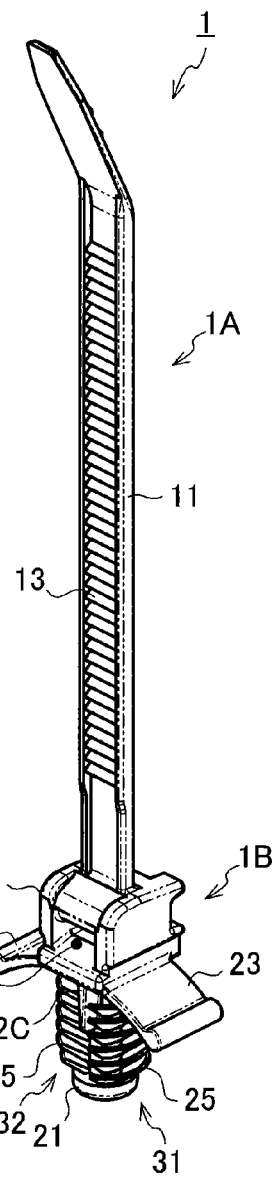
FIG. 1C is a perspective view of the cable tie when viewed from still another direction.
Figure 1C:
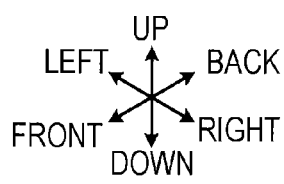
Figure 1C:
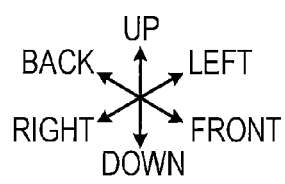
Figure 1C:
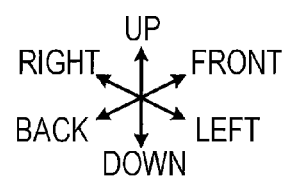

As shown in FIGS. 1A to 1C, and 2A to 2F, a cable tie 1 comprises a main body 1A and a locking mechanism 1B.

The main body 1A has a function as a cable tie. The locking mechanism 1B is formed integrally with the main body 1A and is to be used to be secured, together with the main body 1A, to a mounting surface. These parts of the cable tie 1 are integrally formed together by injection-molding of synthetic resin, such as polyamide resin.

The main body 1A comprises a belt part 11 and a buckle part 12. Among these parts, the belt part 11 is provided with a plurality of engagement projections 13 provided in an aligned manner along a longitudinal direction of the belt part 11 (i.e., up-and-down direction in the figures). The buckle part 12 is provided with a through hole 14 that penetrates the buckle part 12 in the front-and-rear direction in the figures. At a position inside the through hole 14, which is shown at an upper position in the figures, an engagement claw 15 is provided; the engagement claw 15 is capable of changing its position upwardly while being elastically deformed.

When the belt part 11 is curved along a direction in which a surface of the belt part 11, on which the engagement projections 13 are aligned, is made to be an inner circumferential surface and then, a tip end 11A of the belt part 11 is inserted into the through hole 14 of the buckle part 12, the belt part 11 forms a loop shape. Moreover, in such a state forming the loop, when a portion with the plurality of engagement projections 13 being aligned has entered into the through hole 14, the engagement projections 13 engage with the engagement claw 15. This engagement does not allow the belt part 11 to be easily extracted from the through hole 14. Therefore, the belt part 11 and the buckle part 12 as above can be used to wind the aforementioned loop around an outer circumference of an electric-wire bundle, thereby restraining the electric-wire bundle.

Meanwhile, the locking mechanism 1B comprises a supporting column 21, two elastic pieces 23, and a plurality of locking pieces 25. The supporting column 21 projects from a portion formed continuously with the main body 1A (buckle part 12) in one direction (downward direction in the figures). Provided around a base of the supporting column 21 (i.e., upper end in the figures) are ribs 22A to 22D. This enhances flexural rigidity of the supporting column 21. The two elastic pieces 23 extend from respective portions formed continuously with the main body 1A (buckle part 12) in different obliquely downward directions so as to be symmetrical with each other. These elastic pieces 23 are configured to be elastically deformable (which will be described later in detail).

The plurality of locking pieces 25 extend such that each of the locking pieces 25 extends from an outer surface of the supporting column 21 in a direction that forms an obtuse angle with respect to an insertion direction (downward direction in the figures) of the supporting column 21 (i.e., extends in a right diagonally upward direction or a left diagonally upward direction in the figures). Moreover, each of the locking pieces 25 has a shape corresponding to a shape of a part of a cylindrical body that expands from one end (lower end in the figures) toward the other end (upper end in the figures) in a circular truncated cone shape. The locking pieces 25 are disposed at positions at which that a center of the cylindrical body coincides with a center of the supporting column 21.

Furthermore, the plurality of locking pieces 25 form a first array 31 and a second array 32. The first array 31 extends in a projecting direction of the supporting column 21, which is shown in the left side from the supporting column 21 in the figures. The second array 32 extends in the projection direction of the supporting column 21, which is shown in the right side from the supporting column 21 in the figures. That is, the plurality of locking pieces 25 are formed such that one array is arranged at each of opposing positions across the supporting column 21. As a result of this configuration, the two arrays 31 and 32 extending in the projection direction of the supporting column 21 are formed.

In each of the arrays 31 and 32, the locking pieces 25 are aligned spaced apart from one another in the projecting direction of the supporting column 21. Additionally, positions of the locking pieces 25 included in the array 31 are displaced from positions of the corresponding locking pieces 25 included in the array 32 in the projecting direction of the supporting column 21.

As shown in FIG. 3A, a plate material P1 has one surface P1A and the other surface P1B, and the cable tie 1 configured as above is secured to the one surface P1A (hereinafter, the one surface P1A is also referred to as "mounting surface P1A"). That is, this cable tie 1 is used to bind an electric-wire bundle with the main body 1A and then fix such a binding position to the plate material P1.

In an example of the embodiment shown in FIG. 3A, a through hole H1 is formed in the plate material P1. When the cable tie 1 is secured to the plate material P1, the supporting column 21 and the plurality of locking pieces 25 are inserted into the through hole H1 of the plate material P1.

When the supporting column 21 and the plurality of locking pieces 25 are inserted into the through hole H1, the two elastic pieces 23 abut the mounting surface P1A on an inlet side of the through hole H1. Upon this abutment, the elastic pieces 23 are elastically deformed. This causes the elastic pieces 23 to exert on the supporting column 21 a force in a direction of extracting the supporting column 21 from the through hole H1.

Moreover, when the elastic pieces 23 exert the force in the direction of extracting the supporting column 21 from the through hole H1 while the supporting column 21 and the plurality of locking pieces 25 are located in the through hole H1, among the plurality of locking pieces 25, at least one of the locking pieces 25 is caught by an outlet-side peripheral portion of the through hole H1 on the other surface P1B of the plate material P1. As a result of this, the locking piece 25 that has been caught exerts on the supporting column 21 a force in a direction of inhibiting the supporting column 21 from being extracted from the through hole H1.

Consequently, the plate material P1 is clamped by the elastic pieces 23 and the locking pieces 25 at both of the surfaces of the plate material P1, thereby securing the locking mechanism 1B to the plate material P1. As a result, the cable tie 1 is secured to the plate material P1.

Moreover, in the locking mechanism 1B, the first array 31 and the second array 32 are formed such that the positions of the locking pieces 25 included in the array 31 are displaced from the positions of the corresponding locking pieces 25 included in the array 32 in the projecting direction of the supporting column 21. Specifically, each of the first array 31 and the second array 32 comprises six locking pieces 25 provided in an aligned manner. A gap pitch in the alignment of the six locking pieces 25 in the first array 31 is the same as a gap pitch in the alignment of the six locking pieces 25 in the second array 32. Here, the first array 31 is arranged at a slightly lower position than the second array 32.

This positional displacement between the first array 31 and the second array 32 is about ½ of the gap pitch. Accordingly, in the state shown in FIG. 3A, the second-uppermost locking piece 25 in the second array 32 is brought into pressure-contact with the other surface P1B of the plate material P1 stronger than the second-uppermost locking piece 25 in the first array 31.

In a case where the above-described displacement is not provided between the first array 31 and the second array 32, if the plate material P1 is slightly thicker, the third-uppermost locking piece 25 is used instead of the second-uppermost locking piece 25. Thus, in this case, which of the locking pieces 25 is to be caught by the other surface P1B of the plate material P1 can be changed among six ways only.

On the other hand, in the aforementioned locking mechanism 1B, the first array 31 and the second array 32 are formed having the displacement of the ½ gap pitch from each other, as described above. For this reason, following fine adjustments can be made. For example, if the plate material P1 is slightly thicker, instead of the second-uppermost locking piece 25 in the second array 32, the second-uppermost locking piece 25 in the first array 31 can be used. Moreover, if the plate material P1 is further slightly thicker, the third-uppermost locking piece 25 in the second array 32 can be used. In other words, in the aforementioned case, which of the locking pieces 25 is to be caught by the other surface P1B of the plate material P1 can be changed among twelve ways.

Therefore, according to the aforementioned locking mechanism 1B, a pushing amount of the supporting column 21 and the locking pieces 25 can be adjusted by a smaller unit than the gap pitch with which the locking pieces 25 are aligned. Thus, the pushing amount can be changed by much smaller amounts.

Moreover, the locking mechanism 1B configured as above is advantageous when a threaded hole H2 shown in FIG. 3B is used, other than the aforementioned through hole H1. In an example of the embodiment shown in FIG. 3B, the plurality of locking pieces 25 exhibit a coming-off inhibiting effect at an inner circumference of the threaded hole H2 formed in a plate material P2.

In other words, this locking mechanism 1B can be used, not only for catching the locking pieces 25 by the outlet-side peripheral portion of the through hole H1, but also for catching the locking pieces 25 by the inner circumference of the threaded hole H2. Besides, with respect to any hole having a rough inner circumferential surface, such as a hole formed by drilling a plate material made of wood, the locking pieces 25 sufficiently exhibit a coming-off inhibiting effect. Moreover, other than the configuration of being caught by a convex portion of the inner circumferential surface of the hole, the locking pieces 25 may be configured to be brought into pressure-contact with the inner circumferential surface of the hole, thereby exhibiting the coming-off inhibiting effect.

Moreover, in the above-described usage of the locking pieces 25 adapted to be caught by the inner circumferential surface of the hole, the locking pieces 25 sufficiently exhibit a coming-off inhibiting effect regardless of whether the hole is a through hole or a non-through hole (i.e., a hole with a closed end opposite to an opening end thereof). Therefore, the aforementioned locking mechanism 1B can be used to secure the cable tie 1 to the plate material P2 having a thickness equal to or greater than a projecting length of the supporting column 21.

Furthermore, an example of the aforementioned embodiment shown in FIG. 3B can achieve following effects. That is, in a case where the position of the first array 31 is slightly displaced from the position of the second array 32 in the up-and-down direction, when a tip end of the locking piece 25 in the extending direction of the locking piece 25 is engaged with a thread groove having concave-and-convex portions formed on the right and left sides with positional displacements from each other in the up-and-down direction, unnecessary stress is less likely to be applied to the locking piece 25.

Additionally, in an example of the aforementioned embodiment, each of the locking pieces 25 extends from the outer surface of the supporting column 21 in the direction that forms an obtuse angle with respect to the insertion direction of the supporting column 21. For this reason, a coming-off inhibiting effect can be improved by the locking pieces 25, compared with a case in which the portion forming the obtuse angle extends towards a direction forming an acute angle.

Moreover, in an example of the aforementioned embodiment, each of the locking pieces 25 forms a curved surface. Thus, compared with a locking piece formed in a planner shape, each of the locking pieces 25 can have a structure with an excellent bending strength.

Furthermore, in an example of the aforementioned embodiment, the plurality of locking pieces 25 are provided separately into two arrays. For this reason, compared with a case where the plurality of locking pieces 25 are provided separately into three or more arrays, each of the locking pieces 25 can have a larger size, thereby easily obtaining strength of the individual locking piece 25. In addition, a mold for forming the locking pieces 25 does not have an unnecessary complicated shape. Therefore, formability of a member provided with the aforementioned locking mechanism 1B can be enhanced, thereby improving productivity.

[2] Second Embodiment

Next, an illustrative second embodiment will be described. The illustrative second embodiment will be explained mainly focusing on differences from the first embodiment, and common points with the first embodiment are simply assigned with the same reference numerals as those in the first embodiment and will not be explained in detail.

As shown in FIGS. 4A to 4F, a cable tie 51 comprises a main body 51A and a locking mechanism 51B. The main body 51A has a function as a cable tie. The locking mechanism 51B is formed integrally with the main body 51A and is to be used to be secured, together with the main body 51A, to a mounting surface.

Structures of the main body 51A are the same as those of the main body 1A in the previously-described example of the first embodiment. However, the locking mechanism 51B is different from the example in the first embodiment in which a plurality of locking pieces 55 are provided separately into four arrays.

Specifically, the plurality of locking pieces 55 comprise a first array 61, a second array 62, a third array 63, and a fourth array 64. The first array 61 is shown on a diagonally forward left side from the supporting column 21 in the figures and extends in the projecting direction of the supporting column 21; the second array 62 is shown on a diagonally forward right side from the supporting column 21 in the figures and extends in the projecting direction of the supporting column 21; the third array 63 is shown on a diagonally rearward right side from the supporting column 21 in the figures and extends in the projecting direction of the supporting column 21; and the fourth array 64 is shown on a diagonally rearward left side from the supporting column 21 in the figures and extends in the projecting direction of the supporting column 21. That is to say, the plurality of locking pieces 55 extend in four directions from the supporting column 21 as a center, as shown in FIG. 4F.

With respect to the first array 61 and the second array 62, positions of the locking pieces 55 included in the arrays 61 are displaced from positions of the corresponding locking pieces 55 included in the array 62 in the projecting direction of the supporting column 21. In the second embodiment, the positional displacement as described above is not provided with respect to the second array 62 and the third array 63. Also, the positional displacement as described above is not provided with respect to the fourth array 64 and the first array 61.

However, positions of all of the four arrays may be displaced from one another in the projecting direction of the supporting column 21. For example, in each array, if the locking pieces 55 are displaced by a quarter (¼) of a distance of the gap pitch, which is used in the alignment of the locking pieces 55, from the closest piece of the neighboring array in the projecting direction of the supporting column 21, positions of all of the locking pieces 55 can be displaced from one another.

The cable tie 51 described as above can also provide the same operations and effects as those in the example in the first embodiment. Moreover, the locking pieces 55 are disposed separately into four arrays, and thus, the pushing amount can be adjusted much smaller amounts than that in the example of the first embodiment.

[3] Other Embodiments

The illustrative embodiments of the present invention have been described as above; however, the present invention should not be limited to the above-described illustrative embodiments and can be carried out in various modes other than the above embodiments.

For example, it has been described in the above-described example of the first embodiment that the positions of the locking pieces 25 in the first array 31 are displaced from the positions of the corresponding locking pieces 25 in the second array 32 by about ½ gap pitch; however, it is optional whether to have the displacement be exactly ½ gap pitch. For example, in view of manufacturing conditions and other functions, even if the displacement is slightly greater or slightly smaller than the ½ gap pitch, excellent fine adjustment can be achieved, compared with locking pieces without such a displacement.

Moreover, the main body having a function as a cable tie has been described in each of the above-described examples of the embodiments. However, the function of the main body should not be limited to the cable tie. The securing mechanism of the present invention can be adopted in various parts which are intended to be secured to a mounting surface with a hole formed therein. Examples of a specific construction of the main body include, for example, clamps and ducts for holding electric wires, spacers for maintaining gaps between members. In the case of spacers, the securing mechanism of the present invention may be provided at both ends of the spacers.

Alternatively, the securing mechanism of the present invention may be used to configure an alternative of a securing tool comprising a head portion, such as a nail, a screw, and a rivet, and an axial portion. Specifically, the main body is provided as a portion having a corresponding shape to that of the aforementioned head portion, and the securing mechanism of the present invention as a portion corresponding to the aforementioned axial portion may be formed integrally with such a main body. As a result of this, it is possible to configure a securing tool that can be used as an alternative to nails, screws, rivets, etc. In this case, if a hole formed on the mounting surface is configured to be a spot-facing hole (i.e., a hole whose inlet side is spot-faced), part or entirety of the main body corresponding to the aforementioned head portion is accommodated within an opening of the hole, thereby enabling reduction of a protruding amount of the main body that protrudes from the mounting surface.

The invention claimed is:

1. A securing mechanism formed integrally with a main body and configured to be able to be secured, together with the main body, to a mounting surface, the securing mechanism comprising:
   a supporting column;
   an elastic piece; and
   a plurality of locking pieces,
   wherein the supporting column projects from a portion formed continuously with the main body in one direction, and the supporting column is insertable into a hole formed in the mounting surface from a tip end of the supporting column in a direction of a projection of the supporting column,
   wherein, in the supporting column, a plurality of ribs is provided in at least an area formed continuously with the main body,
   wherein the elastic piece is provided at a position that abuts the mounting surface on an inlet side of the hole when the supporting column is inserted into the hole, and, upon the abutment on the mounting surface, the elastic piece is configured to be elastically deformed so as to exert a force on the supporting column in a direction of extracting the supporting column from the hole,
   wherein, when the supporting column is inserted into the hole, at least one of the plurality of locking pieces is configured to be caught by or brought into pressure-contact with an outlet-side peripheral portion of the hole or an inner surface area of the hole, thereby exerting a force on the supporting column in a direction of inhibiting the extraction of the supporting column from the hole,
   wherein the plurality of locking pieces extend such that each of the plurality of locking pieces extends from an outer surface of the supporting column in a direction forming an obtuse angle with respect to a direction of insertion of the supporting column,
   wherein each of the plurality of locking pieces has a shape corresponding to a part of a cylindrical body that expands from one end toward another end in a shape of a circular truncated cone, and the plurality of locking pieces are disposed at positions at which a center of the cylindrical body coincides with a center of the supporting column,
   wherein the plurality of locking pieces form a plurality of arrays extending in the direction of the projection of the supporting column,
   wherein respective locking pieces of the plurality of locking pieces included in each array of the plurality of arrays are aligned to be spaced apart from one another in the direction of the projection of the supporting column,
   wherein the plurality of arrays comprise a first array and a second array, positions of the locking pieces included in the first array being displaced from positions of corresponding locking pieces included in the second array in the direction of the projection of the supporting column;

wherein the plurality of ribs are coupled to the supporting column and the elastic piece, wherein at least one of the plurality of ribs is disposed between the plurality of arrays, and wherein at least one of the plurality of ribs is provided such that at least a part thereof is gradually tapered, from a portion where the supporting column and the main body are continuously formed towards a tip end portion of the at least one of the plurality of ribs.

2. The securing mechanism according to claim 1, wherein at least one of the plurality of ribs is provided to reach an area between the plurality of arrays in the direction of the projection of the supporting column.

3. The securing mechanism according to claim 1, wherein the plurality of locking pieces are provided such that the first array is formed at a position across the supporting column opposite from the second array.

4. The securing mechanism according to claim 1, wherein:

the elastic piece comprises two elastic pieces, and the two elastic pieces extend from respective portions formed continuously with the main body in symmetrical directions across the supporting column so as to be away from the supporting column in the direction of the projection of the supporting column.

5. The securing mechanism according to claim 4, wherein respective tip end portions of the two elastic pieces are located on the tip end side of the supporting column in the direction of the projection of the supporting column from a portion coupled with the main body.

6. The securing mechanism according to claim 4, wherein the two elastic pieces are curved so that a surface on the tip end side of the supporting column in the direction of the projection of the supporting column faces inward.

* * * * *